US007584621B2

(12) United States Patent
Spitzer et al.

(10) Patent No.: US 7,584,621 B2
(45) Date of Patent: Sep. 8, 2009

(54) RADIALLY EXPANDING TURBINE ENGINE EXHAUST CYLINDER INTERFACE

(75) Inventors: Robert Watson Spitzer, Casselberry, FL (US); Kevin Light, Maitland, FL (US); Brian Harry Terpos, Oviedo, FL (US); Dan Guinan, Hobe Sound, FL (US)

(73) Assignee: Siemens Energy, Inc., Orlando, FL (US)

(*) Notice: Subject to any disclaimer, the term of this patent is extended or adjusted under 35 U.S.C. 154(b) by 797 days.

(21) Appl. No.: 11/197,987

(22) Filed: Aug. 5, 2005

(65) Prior Publication Data

US 2007/0031247 A1 Feb. 8, 2007

(51) Int. Cl.
*F02C 7/20* (2006.01)

(52) U.S. Cl. ........................................ 60/800; 60/39.5

(58) Field of Classification Search .................. 60/796, 60/800, 805, 39.5
See application file for complete search history.

(56) References Cited

U.S. PATENT DOCUMENTS

| | | | | |
|---|---|---|---|---|
| 3,085,773 | A * | 4/1963 | Anstrom et al. | 248/555 |
| 3,243,126 | A * | 3/1966 | Kurti et al. | 239/265.39 |
| 3,415,337 | A | 12/1968 | Karasievich | |
| 3,536,262 | A | 10/1970 | Hachard | |
| 4,002,024 | A * | 1/1977 | Nye et al. | 60/262 |
| 4,093,388 | A | 6/1978 | MacArthur | |
| 4,128,208 | A * | 12/1978 | Ryan et al. | 239/265.39 |
| 4,441,313 | A * | 4/1984 | Joubert et al. | 60/262 |
| 4,452,038 | A | 6/1984 | Soligny | |
| 4,571,936 | A | 2/1986 | Nash et al. | |
| 4,907,743 | A | 3/1990 | Bouiller et al. | |
| 4,965,994 | A | 10/1990 | Ciokajlo et al. | |
| 4,994,660 | A | 2/1991 | Hauer | |
| 5,088,279 | A * | 2/1992 | MacGee | 60/226.1 |
| 5,103,638 | A | 4/1992 | Roberts et al. | |
| 5,491,974 | A | 2/1996 | Shimmel et al. | |
| 5,537,814 | A | 7/1996 | Nastuk et al. | |
| 5,782,078 | A | 7/1998 | Brantley | |
| 6,792,758 | B2 * | 9/2004 | Dowman | 60/772 |

FOREIGN PATENT DOCUMENTS

JP 01244118 A 9/1989

* cited by examiner

*Primary Examiner*—Ted Kim

(57) ABSTRACT

Aspects of the invention are directed to an interface between an exhaust cylinder and an exhaust diffuser in a turbine engine. The interface allows relative radial movement of the exhaust diffuser and the exhaust cylinder. According to aspects of the invention, the diffuser and the cylinder are operatively connected about their peripheries by a plurality of connecting members, which can be tie rods. Each connecting member can be pivotally connected at a first end to a joint bolt affixed to the exhaust cylinder and at a second end to an exhaust diffuser. Thus, the connecting members can join the cylinder and the diffuser in the axial direction, while allowing for the differential thermal expansion of the two components. Relative circumferential movement between the cylinder and the diffuser can be reduced by positioning neighboring connecting members at opposing angles in relation to one another.

16 Claims, 3 Drawing Sheets

RADIALLY EXPANDING TURBINE ENGINE EXHAUST CYLINDER INTERFACE

FIELD OF THE INVENTION

The invention relates in general to turbine engines and, more particularly, to the exhaust portion of turbine engines.

BACKGROUND OF THE INVENTION

The exhaust portion of a turbine engine typically includes an exhaust cylinder and an exhaust diffuser. During engine operation, hot exhaust gases pass through the exhaust cylinder and the exhaust diffuser, causing these components to thermally expand in the radial direction. However, the exhaust cylinder and the exhaust diffuser expand at different rates. In some engines, the interface between the exhaust cylinder and the exhaust diffuser is rigid at least in the radial direction, thereby inhibiting relative radial movement of these components. Consequently, stresses are placed on the interface, making it susceptible to low cycle fatigue (LCF), which can manifest as cracks, fractures or failures.

LCF failures of the exhaust cylinder and exhaust diffuser interface result in increased downtime to repair the interface and maintain the integrity of the turbine. Often, these repairs require the time-consuming and labor intensive disassembly of the external components surrounding the interface. Thus, there is a need for an interface between the exhaust cylinder and the exhaust diffuser that can minimize such concerns.

SUMMARY OF THE INVENTION

Aspects of the invention are directed to an interface between a first turbine engine component and a second turbine engine component that are substantially coaxial. In one embodiment, the first turbine engine component can be an exhaust cylinder, and the second turbine engine component can be an exhaust diffuser.

The first and second turbine engine components are operatively connected by a plurality of connecting members, which can be tied rods. Each connecting member has a first end and a second end. The first end of each connecting member is connected to the first turbine engine component, and the second end of each connecting member is connected to the second turbine engine component.

At least a portion of each of the ends is pivotable. To that end, at least one of the pivotable ends of the connecting member can include a bearing housing with a pivot bearing therein. In one embodiment, the first and second ends of each connecting member can be at least partially spherically pivotable. Thus, the connecting members can maintain a structural connection between the first and second turbine engine components while permitting relative radial movement of the components.

Each connecting member can be angled relative to a neighboring connecting member. The neighboring connecting members can be angled from about 25 degrees to about 165 degrees relative to each other.

In another respect, aspects of the invention are directed to a turbine engine interface between a first turbine engine component and a second turbine engine component. The first and second turbine engine components are substantially coaxial. The interface can permit relative radial movement of the first and second turbine engine components. In one embodiment, the first turbine engine component can be an exhaust cylinder, and the second turbine engine component can be an exhaust diffuser. The first turbine engine component has a plurality of first mounting posts connected thereto and extending therefrom; the second turbine engine component has a plurality of second mounting posts connected thereto and extending outward therefrom.

A plurality of connecting members operatively connect the first turbine engine component and the second turbine engine component. The connecting members can be, for example, tie rods. Each connecting member has a first end and a second end. At least a portion of each end is pivotable. In one embodiment, the first and second ends of the connecting members can be at least partially spherically pivotable. One or both ends of each connecting member can include a bearing housing with a pivot bearing therein.

Each first end is connected to one of the first mounting posts, and each second end is connected to one of the second mounting posts. The connecting members can be secured to each mounting post by lug nuts, friction fittings and/or welds. In one embodiment, each end of the connecting members can be secured to a respective mounting post by a lug nut and a retainer. The retainer can be one or more of the following: a lock nut, a lock washer, a spring washer, a wedge-lock washer, a cotter pin, a split pin or a weld.

Each connecting member can be angled relative to a neighboring connecting member. For instance, the neighboring connecting members can be angled from about 25 degrees to about 165 degrees relative to each other.

In yet another respect, aspects of the invention are directed to a radially expanding turbine engine exhaust cylinder interface. The interface includes an exhaust cylinder and an exhaust diffuser that are substantially coaxial. The exhaust cylinder has a plurality of mounting posts connected about and extending outward from the periphery of the exhaust cylinder. Likewise, the exhaust diffuser has a plurality of mounting posts connected about and extending outward from the periphery of the exhaust diffuser.

According to aspects of the invention, a plurality of tie rods operatively connect the exhaust cylinder and the exhaust diffuser. Each tie rod has a first end and a second end. At least a portion of each end is pivotable. In one embodiment, one or both ends of each tie rod can include a bearing housing with a pivot bearing therein. Each first end is connected to one of the mounting posts on the exhaust cylinder, and each second end is connected to one of the mounting posts on the exhaust diffuser. Thus, relative radial movement between the exhaust cylinder and the exhaust diffuser is permitted. In one embodiment, each tie rod can be angled relative to a neighboring tie rod from about 25 degrees to about 165 degrees.

DETAILED DESCRIPTION OF EMBODIMENTS OF THE INVENTION

Figure 2:
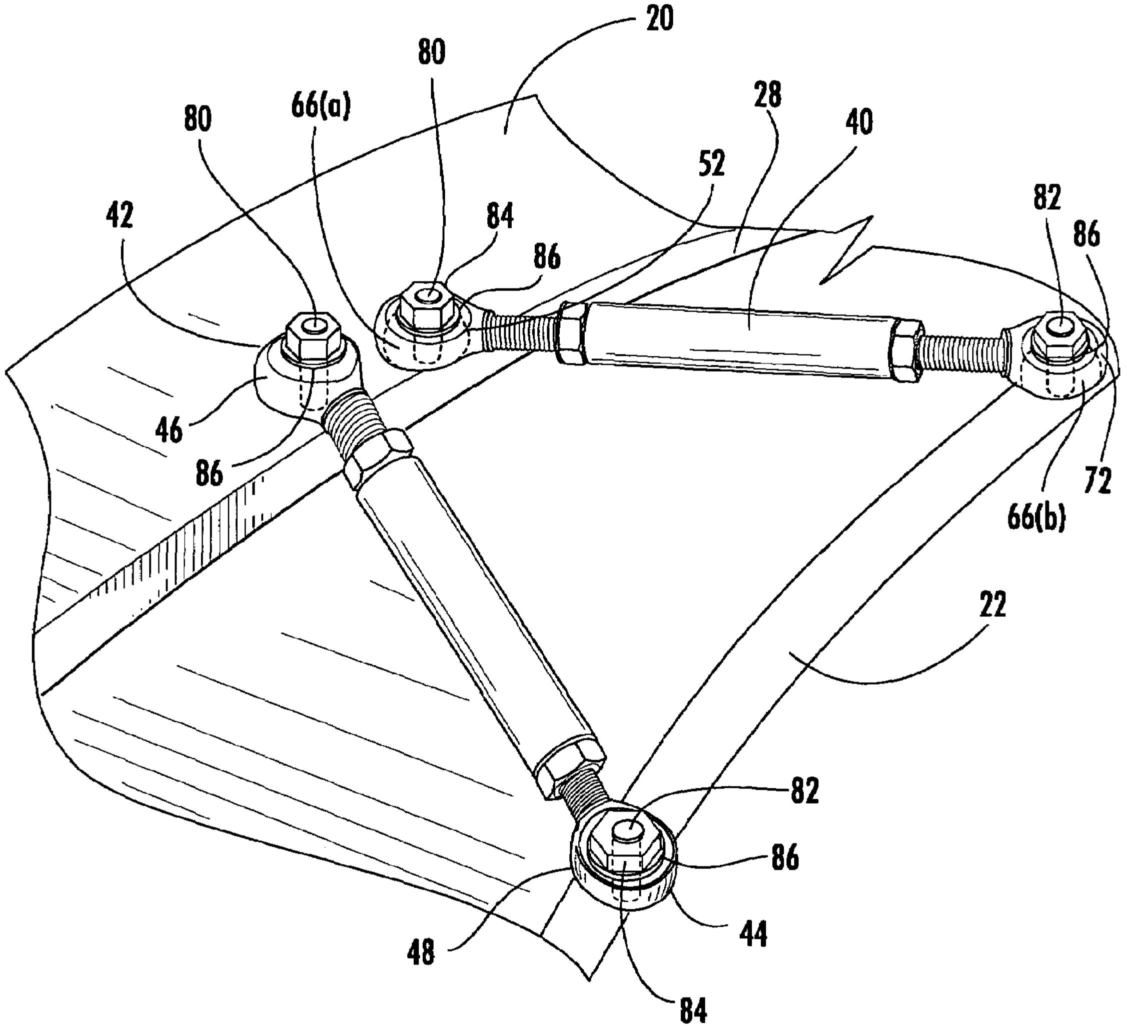
FIG. 2 is a close-up perspective view of a portion of the exhaust cylinder-exhaust diffuser interface of FIG. 1, showing an arrangement of a pair of connecting members according to aspects of the invention.
Figure 3:
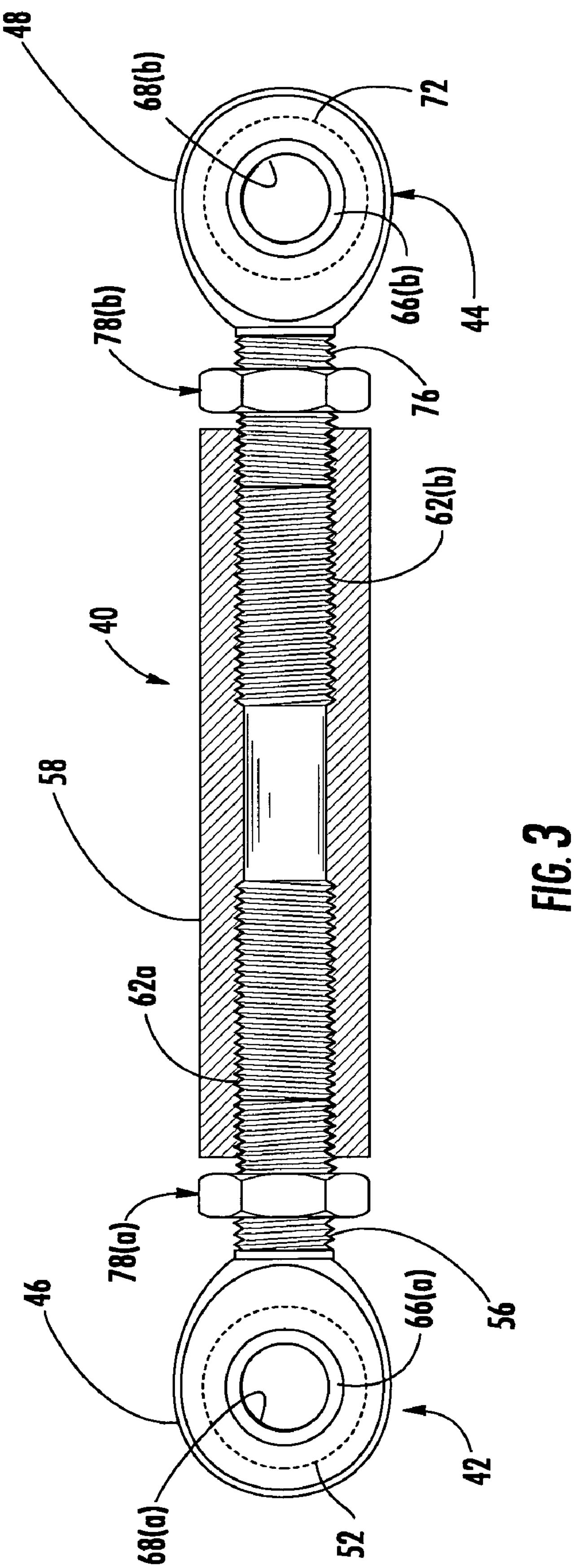
FIG. 3 is cutaway plan view of one embodiment of a connecting member according to aspects of the invention, wherein the connecting member is a tie rod.

Aspects of the invention are directed to an interface between two or more turbine engine components with different rates of thermal expansion. Embodiments of the invention will be explained in connection with an exhaust cylinder and an exhaust diffuser, but the detailed description is intended only as exemplary. Embodiments of the invention are shown in FIGS. 1-3, but the present invention is not limited to the illustrated structure or application.

It is noted that use herein of the terms "circumferential," "radial" and "axial" and variations thereof is intended to mean relative to the turbine. An interface according to aspects of the invention allows relative radial movement between two or more turbine engine components. The interface can further be configured to minimize the relative axial and/or circumferential movement between the two or more turbine engine components.

Figure 1:
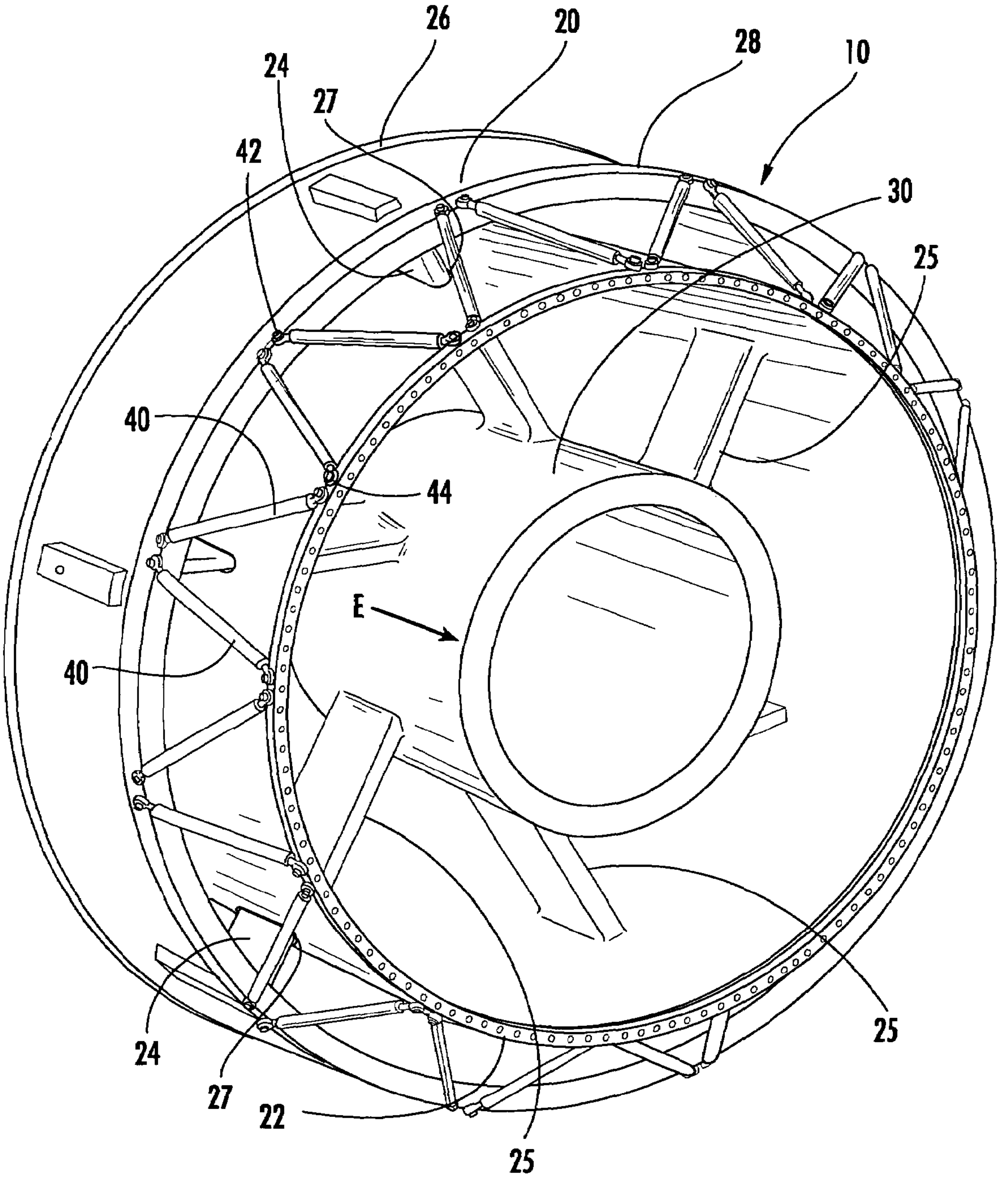
FIG. 1 is a perspective view of an exhaust cylinder-exhaust diffuser interface according to aspects of the present invention.

Referring to FIG. 1, an exemplary radially expanding interface for the exhaust portion of a turbine engine is illustrated and generally referred to by reference numeral 10. The interface 10 generally connects two or more turbine engine components, particularly those components that are substantially coaxial. For instance, the interface 10 according to aspects of the invention can be used to connect an exhaust cylinder 20 and an exhaust diffuser 22. The exhaust cylinder 20 and the exhaust diffuser 22 can be substantially coaxial. Generally, the exhaust cylinder 20 can have a leading edge 26 and a trailing edge 28. Support struts 24 can connect between the exhaust cylinder 20 and a shaft bearing (not shown) provided within an inner diffuser case 30, which can support the internal shaft (not shown) of the engine. Passages 27 can be provided in the exhaust diffuser 22 to allow the struts 24 to pass therethrough. Those portions of each support strut 24 that extend within the path of the exhaust gas E (that is, in the space between the exhaust diffuser 22 and the housing 30) can be protected by a heat shield 25. The heat shields 25 can connect between the exhaust diffuser 22 and the shaft bearing housing 30. The support struts 24 can extend through the heat shields 25.

The interface 10 according to aspects of the invention can include a plurality of connecting members that operatively connect the exhaust cylinder 20 and the exhaust diffuser 22, while permitting relative radial motion of these components, which may arise due to differing rates of thermal expansion, among other things. Each connecting member can have a first end and a second end. According to aspects of the invention, at least a portion of the first and second ends of each connecting member can be pivotable. It should be noted that the term "pivotable" as used herein includes but is not limited to two dimensional pivoting motion. The term "pivotable" can further include three dimensional pivoting motion as well as other non-pivoting motion. For instance, at least a portion of the first and second ends of each connecting member can be at least partially spherically pivotable, allowing multi-directional pivoting motion as well as rotation about an axis. In such case, the range of motion of the first and second ends can be similar to at least a part of the range of motion of a ball and socket type joint. In another embodiment, at least a portion of the first and second ends of each connecting member can be substantially radially pivotable; that is, at least a portion of each of the first and second ends can, at a minimum, pivot and/or rotate substantially about an axis that is substantially in the radial direction.

As will be described in more detail below, the first end of each connecting member can be connected to the exhaust cylinder 20, preferably at or near the trailing edge 28. In one embodiment, the first end of the connecting member can be connected to a platform (not shown) jutting from the trailing edge 28 of the exhaust cylinder 20. Each connecting member can further be connected at its second end to the exhaust diffuser 22.

The connecting members can support the weight of the exhaust diffuser 22. In one embodiment, the connecting members can be the sole support of the exhaust diffuser 22. In addition, the connecting members can substantially axially fix the exhaust diffuser 22 relative to the exhaust cylinder 20. Further, the connecting members can otherwise substantially retain the exhaust diffuser 22 in place, preventing undesired motion of the exhaust diffuser 22 such as vertical movement or tipping. Ideally, the connecting members can substantially maintain the substantially coaxial relationship between the exhaust diffuser 22 and the exhaust cylinder 20.

There can be any quantity of connecting members. In one embodiment, the interface 10 can include twenty-four connecting members. The connecting members can be arrayed about the interface 10 in various ways. For example, the connecting members can be provided about the interface 10 at substantially regular intervals. However, other arrangements including irregular intervals are possible.

The connecting members can also be positioned in various ways. For example, the connecting members can be provided in pairs. In each pair, the connecting members can be angled relative to one another. Such an arrangement can minimize relative circumferential movement between the exhaust diffuser 22 and the exhaust cylinder 20, which may occur due to twisting or torquing. In one embodiment, there can be at least four pairs of connecting members provided about the interface, and, preferably, the connecting member pairs are substantially equally spaced.

In one embodiment, a pair of the connecting members can be angled from about 25 degrees to about 165 degrees in relation to one another. More specifically, the connecting members can be angled from about 60 degrees to about 120 degrees relative to each another. In one embodiment, a pair of the connecting members can be positioned at substantially 90 degrees relative to each other. The angle between one pair of connecting members can be substantially the same for each pair of connecting members about the interface 10. However, at least one pair of connecting members can be positioned at a different relative angle from the other pairs.

The connecting members can be any of a number of devices. In one embodiment, the connecting members can be tie rods 40. An example of a tie rod 40 according to aspects of the invention is shown in FIG. 3. The tie rod 40 can generally include a first end 42, a rod link 58, and a second end 44. As will be explained in more detail below, at least a portion of the first and second ends 42, 44 of the tie rod 40 can be radially pivotable. The tie rods 40 can be made of almost any material, but it is preferred if the tie rods 40 are made of a heat resistant material, such as, for example, 300 series stainless steel or other material having sufficient heat resistance and strength to maintain the connection between two turbine engine components.

The first end 42 of the tie rod 40 can include a first connection assembly 46. The first connection assembly 46 can include a bearing housing 52 with a channeled pivot bearing 66(*a*) contained therein. The bearing housing 52 and the pivot bearing 66(*a*) can move relative to each other. In one embodiment, the bearing housing 52 and the pivot bearing 66(*a*) can be adapted to allow at least partial spherical movement relative to each other. The first connection assembly 46 can include any other means that can permit a radially pivotable attachment between the first end 42 of the tie rod 40 and the turbine engine component to which it is attached. The first connection assembly 46 can be connected to the rod link 58 in various manners. In one embodiment, the first connection assembly 46 can be connected to the rod link 58 by threaded engagement. To that end, the first connection assembly 46 can include external threads 56, and the rod link 58 can provide complementary internal threads 62(*a*).

The second end 44 of the tie rod 40 can include a second connection assembly 48. The second connection assembly 48 can include a bearing housing 72 with a channeled pivot bearing 66(*b*) contained therein. The bearing housing 72 and the pivot bearing 66(*b*) can move relative to each other. Preferably, the bearing housing 72 and the pivot bearing 66(*b*) can be adapted to allow at least partial spherical movement relative to each other. The second connection assembly 48 can provide any other means that can provide a radially pivotal attachment between the second end 44 of the tie rod 40 and a turbine engine component to which it is attached. The second connection assembly 48 can be connected to the rod link 58 in various manners. In one embodiment, the second connection assembly 48 can be connected to the rod link 58 by threaded engagement. In such case, the second connection assembly 48 can include external threads 76, and complementary internal threads 62(*b*) can be provided in the rod link 58. In one embodiment, the external threads 76 on the second connection assembly 48 can be opposite to the external threads 56 on the first connection assembly 46.

To facilitate installation, it is preferred if the overall length of the tie rod 40 is adjustable. In the context of the tie rod 40 shown in FIG. 3, it will be appreciated that adjustment of the length of the tie rod 40 can be achieved by increasing or decreasing the amount of threaded engagement between the first and second connection assemblies 46, 48 and the rod link 58.

Once the desired length is achieved, the tie rod 40 can be configured to secure the position and affix the length of the tie rod 40. In one embodiment, the tie rod 40 can include jam nuts 78(*a*), 78(*b*). One of the jam nuts 78(*a*) can engage a portion of the first connection assembly 46, such as external threads 56. Similarly, the other jam nut 78(*b*) can engage a portion of the second connection assembly 48, such as external threads 76. When the desired length is achieved, the jam nuts 78(*a*), 78(*b*) can be tightened against the rod link 58 to minimize or prevent any undesired change in position of the tie rod assembly 40. Naturally, the jam nuts 78(*a*), 78(*b*) can be loosened to permit allow adjustment of the length of the tie rod 40.

The first and second ends 42, 44 of each tie rod 40 can be connected to the exhaust cylinder 20 and the exhaust diffuser 22 in various ways. The exhaust cylinder 20 and the exhaust diffuser 22 can be adapted as needed to facilitate such operative connection. For example, as shown in FIG. 2, a plurality of mounting posts 80 can be disposed about the periphery of the trailing edge 28 of the exhaust cylinder 20, and a plurality of mounting posts 82 can be disposed about the periphery of the exhaust diffuser 22. The mounting posts 80, 82 can be affixed to and extend outward from the exhaust cylinder 20 and exhaust diffuser 22, respectively. In one embodiment, the mounting posts 80, 82 can extend substantially radially outward from the exhaust cylinder 20 and exhaust diffuser 22, respectively. The mounting posts 80, 82 can be threaded or unthreaded. The mounting posts 80, 82 can be bolts, studs or any other structure to which the ends 42, 44 of the tie rods 40 can connect.

The first end 42 of the tie rod 40 can receive one of the mounting posts 80 on the exhaust cylinder 20, and the second end 44 of the tie rod 40 can receive one of the diffuser mounting posts 82 on the exhaust diffuser 22. In one embodiment, the pivot bearings 66(*a*), 66(*b*) housed in the respective bearing housings 52, 72 of the first connection assembly 46 and second radially pivotally connection assembly 48 can include channels 68(*a*), 68(*b*) for receiving and connecting to the mounting posts 80, 82.

Once connected to the mounting posts 80, 82, the ends 42, 44 of the tie rods 40 can be secured in place on the respective mounting posts 80, 82. Securement can be achieved by, for example, a lug nut 84, a friction fitting (not shown), or a weld (not shown). Alternative or additional securement devices can be used. For example, when lug nuts 84 are used, each lug nut 84 can be retained in place by a retainer 86, such as, for example, a lock nut, a lock washer, a spring washer, a wedge-lock washer, a cotter pin, a split pin, a weld or an anti-rotation device to prevent undesired loosening of the lug nuts 84. In one embodiment, the wedge-lock washers can be Nord-Lock washers, manufactured by Nord-Lock AB of Mattmar, Sweden.

Having described the individual components of the interface according to aspects of the invention, procedures for practicing aspects of the invention will now be described. It will be understood that the following explanations should not be construed as limiting and that any and all obvious variations are included.

During operation of a turbine engine, the exhaust gas E is axially passed through the exhaust cylinder 20 and exhaust diffuser 22. The intense heat and pressure of the exhaust gas E causes the components to thermally expand in the radial direction. The exhaust diffuser 22, due to its smaller size in relation to the exhaust cylinder 20, is subjected to a faster rate of heat absorption and can expand at a rate higher than that of the exhaust cylinder 20.

As the expansion occurs, the tie rods 40 disposed about the periphery of the interface 10 allow the exhaust diffuser 22 to expand radially while substantially restricting other movement of the exhaust diffuser 22. For instance, as noted earlier, the tie rods 40 can maintain an axial connection between the exhaust cylinder 20 and the exhaust diffuser 22. Further, relative circumferential movement between the exhaust cylinder 20 and the exhaust diffuser 22 can be minimized by positioning the tie rods 40 at angles in relation to one another. The tie rods 40 can also prevent other undesired movement of the exhaust diffuser 22, such as vertical up and down motion and tipping. Ideally, the tie rods 40 maintain the substantially coaxial relationship of the exhaust cylinder 20 and the exhaust diffuser 22.

Again, the differential rate of radial expansion of the exhaust cylinder 20 and the exhaust diffuser 22 can be accommodated by the pivotable ends 42, 44 of the tie rods 40. For instance, as the exhaust diffuser 22 expands radially outward, the pivot bearing 66(*b*) in the second connection assembly 48 can remain substantially fixed around the mounting post 82. However, the bearing housing 72 can pivot relative to the mounting post 82, which can extend radially from the exhaust diffuser 22. The bearing housing 72 can also rotate relative to the mounting post 82. Similar motions can occur at the connection between the first end 42 of the tie rod 40 and the exhaust cylinder 20. Preferably, the pivotable ends 42, 44 of the tie rods 40 impart little or no bending loads on the exhaust cylinder 20 and the exhaust diffuser 22.

An interface according to aspects of the invention can provide numerous advantages. For example, the interface can protect and maintain the integrity of the connection between the exhaust cylinder and exhaust diffuser. As a result, there can be a reduction in the occurrence of component failure and attendant downtime. In addition, the interface can facilitate the location of the diffuser during assembly. Further, the connecting members can be made at a relatively low cost and can be easily replaced if they require repair due to wear or abusive operation.

In as much as the proceeding disclosure presents the best mode devised by the inventors for practicing invention and is intended to enable one skilled and the pertinent art to carry it out, it is apparent that structures and methods incorporating modifications and variations will be obvious to those skilled in the art. For instance, it will be appreciated that the interface can be used in a gas turbine or other turbine engine, such as for example, a dual fuel turbine engine. As such, it should not be construed to be limited thereby but should included aforementioned obvious variations and be limited only by the spirit and scope of the following claims.

What is claimed is:

1. An interface between two turbine engine components, comprising:

an exhaust cylinder formed from a generally cylindrical housing;

an exhaust diffuser formed from a generally cylindrical housing, wherein the first and second turbine components are substantially coaxial;

a plurality of connecting members operatively connecting the first and second turbine engine components, each connecting member having a first end and a second end, at least a portion of each of the ends being pivotable, wherein the first end of each connecting member is connected to the first turbine engine component and the second end of each connecting member is connected to the second turbine engine component, whereby relative radial movement of the first and second turbine engine components is permitted;

wherein each connecting member is angled relative to a circumferentially adjacent connecting member and angled relative to a longitudinal axis;

wherein each connecting member extends circumferentially angled outward from an outlet of the exhaust cylinder to an outlet of the exhaust diffuser.

2. The interface of claim 1 wherein the connecting members are tie rods.

3. The interface of claim 1 wherein the neighboring connecting members are angled from about 25 degrees to about 165 degrees relative to each other.

4. The interface of claim 1 wherein the first and second ends of the connecting members are at least partially spherically pivotable.

5. The interface of claim 1 wherein at least one of the pivotable ends of the connecting member includes a bearing housing with a pivot bearing therein.

6. The interface of claim 1 wherein each connecting member has an associated length, wherein the length of the connecting members is adjustable.

7. A turbine engine interface comprising:

an exhaust cylinder formed from a generally cylindrical housing having a plurality of first mounting posts connected thereto and extending therefrom;

an exhaust diffuser formed from a generally cylindrical housing having a plurality of second mounting posts connected thereto and extending outward therefrom; wherein the first and second turbine components are substantially coaxial;

a plurality of connecting members operatively connecting the first turbine engine component and the turbine engine component, each connecting member having a first end and a second end, at least a portion of each end being pivotable, wherein each first end is connected to one of the first mounting posts and each second end is connected to one of the second mounting posts, whereby relative radial movement of the first and second turbine engine components is permitted;

wherein each connecting member is angled relative to a circumferentially adjacent connecting member and angled relative to a longitudinal axis;

wherein each connecting member extends circumferentially angled outward from an outlet of the exhaust cylinder to an outlet of the exhaust diffuser.

8. The interface of claim 7 wherein the neighboring connecting members are angled from about 25 degrees to about 165 degrees relative to each other.

9. The interface of claim 7 wherein at least one of the ends of the connecting member includes a bearing housing with a pivot bearing therein.

10. The interface of claim 7 wherein the connecting members are secured to each mounting post by one of lug nuts, friction fittings and welds.

11. The interface of claim 7 wherein each end of the connecting members is secured to one of the mounting posts by a lug nut and a retainer, wherein the retainer is selected from the group consisting of a lock nut; a lock washer; a spring washer; a wedge-lock washer; a cotter pin; a split pin and a weld.

12. The interface of claim 7 wherein the first and second ends of the connecting members are at least partially spherically pivotable.

13. The interface of claim 7 wherein the connecting members are tie rods.

14. A radially expanding turbine engine exhaust cylinder interface comprising:

an exhaust cylinder having a plurality of mounting posts connected about and extending outward from the periphery of the exhaust cylinder;

an exhaust diffuser having a plurality of mounting posts connected about and extending outward from the periphery of the exhaust diffuser, the exhaust cylinder and the exhaust diffuser being substantially coaxial; and a plurality of tie rods operatively connecting the exhaust cylinder and the exhaust diffuser, each tie rod haying a first end and a second end, at least a portion of each end being pivotable, wherein each first end is connected to one of the mounting posts on the exhaust cylinder and each second end is connected to one of the mounting posts on the exhaust diffuser, whereby relative radial movement of the exhaust cylinder and the exhaust diffuser is permitted;

wherein each connecting member is angled relative to a circumferentially adjacent connecting member and angled relative to a longitudinal axis;

wherein each connecting member extends circumferentially angled outward from an outlet of the exhaust cylinder to an outlet of the exhaust diffuser.

15. The exhaust cylinder interface of claim 14 wherein each tie rod is angled relative to a neighboring tie rod from about 25 degrees to about 165 degrees.

16. The interface, of claim 14 wherein at least one of the ends of each tie rod includes a bearing housing with a pivot bearing therein.

* * * * *